US012780692B2

(12) United States Patent
Ichihara et al.

(10) Patent No.: US 12,780,692 B2
(45) Date of Patent: Nov. 3, 2026

(54) ULTRAPURE WATER PRODUCTION SYSTEM AND METHOD FOR PRODUCING ULTRAPURE WATER

(71) Applicant: ORGANO CORPORATION, Tokyo (JP)

(72) Inventors: Fumitaka Ichihara, Tokyo (JP); Fumio Sudo, Tokyo (JP); Tsukasa Kondo, Tokyo (JP); Hiroshi Sugawara, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 552 days.

(21) Appl. No.: 18/038,050

(22) PCT Filed: Aug. 4, 2021

(86) PCT No.: PCT/JP2021/029007
§ 371 (c)(1),
(2) Date: May 22, 2023

(87) PCT Pub. No.: WO2022/113431
PCT Pub. Date: Jun. 2, 2022

(65) Prior Publication Data
US 2023/0416120 A1 Dec. 28, 2023

(30) Foreign Application Priority Data
Nov. 30, 2020 (JP) ................................ 2020-198484

(51) Int. Cl.
*C02F 1/42* (2023.01)
*C02F 1/44* (2023.01)
*C02F 103/04* (2006.01)

(52) U.S. Cl.
CPC ................ *C02F 1/42* (2013.01); *C02F 1/444* (2013.01); *C02F 2103/04* (2013.01); *C02F 2209/40* (2013.01)

(58) Field of Classification Search
CPC .............. B01D 61/18; C02F 1/20; C02F 1/32; C02F 1/42; C02F 1/444; C02F 2001/422;
(Continued)

(56) References Cited

U.S. PATENT DOCUMENTS

2011/0180491 A1* 7/2011 Tokoshima ............ C02F 1/725
210/762
2016/0059273 A1* 3/2016 Yano ........................ C23G 1/20
134/21
2016/0233082 A1* 8/2016 Yano ................. H01L 21/67017

FOREIGN PATENT DOCUMENTS

CN 109982976 7/2019
JP 9-187765 A 7/1997
(Continued)

OTHER PUBLICATIONS

International Search Report issued Oct. 5, 2021 in International Bureau of WIPO Patent Application No. PCT/JP2021/029007, along with an English translation thereof.
Written Opinion issued Oct. 5, 2021 in International Bureau of WIPO Patent Application No. PCT/JP2021/029007, along with an English translation thereof.
(Continued)

*Primary Examiner* — Dirk R Bass
(74) *Attorney, Agent, or Firm* — Greenblum & Bernstein, P.L.C.

(57) ABSTRACT

An ultrapure water production system that has a simplified configuration and that can efficiently remove fine particles that are contained in ultrapure water is provided. Ultrapure water production system has ultrapure water supply line that is connected to point of use and that supplies ultrapure water
(Continued)

to point of use; return line that returns the ultrapure water that has not been used at point of use to ultrapure water supply line; and at least one ion exchange apparatus that is provided on ultrapure water supply line. Space velocity of water to be treated that flows in final-stage ion exchange apparatus is 170 (1/hr) or more, and wherein final-stage ion exchange apparatus is an ion exchange apparatus that is closest to point of use from among at least one ion exchange apparatus.

8 Claims, 7 Drawing Sheets

(58) Field of Classification Search
CPC ........... C02F 2001/427; C02F 2103/04; C02F 2209/40; C02F 2301/02; C02F 2303/18; C02F 9/00
See application file for complete search history.

(56) References Cited

FOREIGN PATENT DOCUMENTS

| | | | |
|---|---|---|---|
| JP | 10-57956 | A | 3/1998 |
| JP | 2002-263643 | A | 9/2002 |
| JP | 2003-145148 | A | 5/2003 |
| JP | 2010-234356 | A | 10/2010 |
| JP | 2016-64342 | A | 4/2016 |
| TW | I461370 | B | 11/2014 |
| WO | 2018/096700 | | 5/2018 |
| WO | 2019/221187 | A1 | 11/2019 |
| WO | 2019/239853 | A1 | 12/2019 |

OTHER PUBLICATIONS

Office Action, dated Jul. 22, 2025 in Taiwanese family member application No. 110142852, with English language translation thereof.

* cited by examiner

HE: Heat exchanger
UV: Ultraviolet ray oxidization apparatus
CP1: Cartridge polisher (upstream ion exchange apparatus)
MD: Membrane deaerator
UF: Ultrafiltration membrane apparatus
FI: Flow indicator
CP2: Resin column (final-stage ion exchange apparatus)
LPC: Liquid particle counter (Particle Measuring Systems, ULTRA DI20™)

ULTRAPURE WATER PRODUCTION SYSTEM AND METHOD FOR PRODUCING ULTRAPURE WATER

FIELD OF THE INVENTION

The present application is based on and claims priority from JP2020-198484 filed on Nov. 30, 2020, the disclosure of which is hereby incorporated by reference herein in its entirety.

The present invention relates to an ultrapure water production system and a method for producing ultrapure water.

DESCRIPTION OF THE RELATED ART

An ultrapure water production system has a subsystem that produces ultrapure water from primary pure water. The subsystem has various apparatuses such as an ultraviolet ray oxidization apparatus and an ion exchange apparatus that are arranged in a series, and primary pure water is sequentially treated by these apparatuses in order to produce ultrapure water. A membrane filter apparatus such as an ultrafiltration membrane apparatus for removing fine particles is provided immediately upstream of a point of use to which ultrapure water is supplied. Recently, the demand for the water quality of ultrapure water has been increasing, and fine particles in ultrapure water is required to be controlled on the order of 10 nanometers. JP2016-64342 discloses an ultrapure water production system that has two ultrafiltration membrane apparatuses arranged in a series at the most downstream point.

SUMMARY OF THE INVENTION

The ultrapure water production system disclosed in JP2016-64342 is significantly effective from the viewpoint of reducing fine particles. However, the configuration in which two ultrafiltration membrane apparatuses are arranged in a series not only increases cost but also entails problems such as a decrease in flow rate and an increase in power consumption of pumps due to increasing pressure loss.

The present invention aims at providing an ultrapure water production system that has a simplified configuration and that can efficiently remove fine particles that are contained in ultrapure water.

An ultrapure water production system of the present invention comprises: an ultrapure water supply line that is connected to a point of use and that supplies ultrapure water to the point of use; a return line that returns the ultrapure water that has not been used at the point of use to the ultrapure water supply line; and at least one ion exchange apparatus that is provided on the ultrapure water supply line. Space velocity of water to be treated that flows in a final-stage ion exchange apparatus is 170 (1/hr) or more, and wherein the final-stage ion exchange apparatus is an ion exchange apparatus that is closest to the point of use from among the at least one ion exchange apparatus.

The inventors found that fine particles can be efficiently removed by setting the space velocity of water to be treated that flows in the final-stage ion exchange apparatus to 170 (1/hr) or more. Since an ion exchange apparatus is typically provided in an ultrapure water production system, no additional apparatus is required. Thus, according to the present invention, it is possible to provide an ultrapure water production system that has a simplified configuration and that can efficiently remove fine particles that are contained in ultrapure water.

The above and other objects, features and advantages of the present invention will become apparent from the following description with reference to the accompanying drawings that illustrate examples of the present invention.

DESCRIPTION OF EMBODIMENTS

First Embodiment

Figure 1:
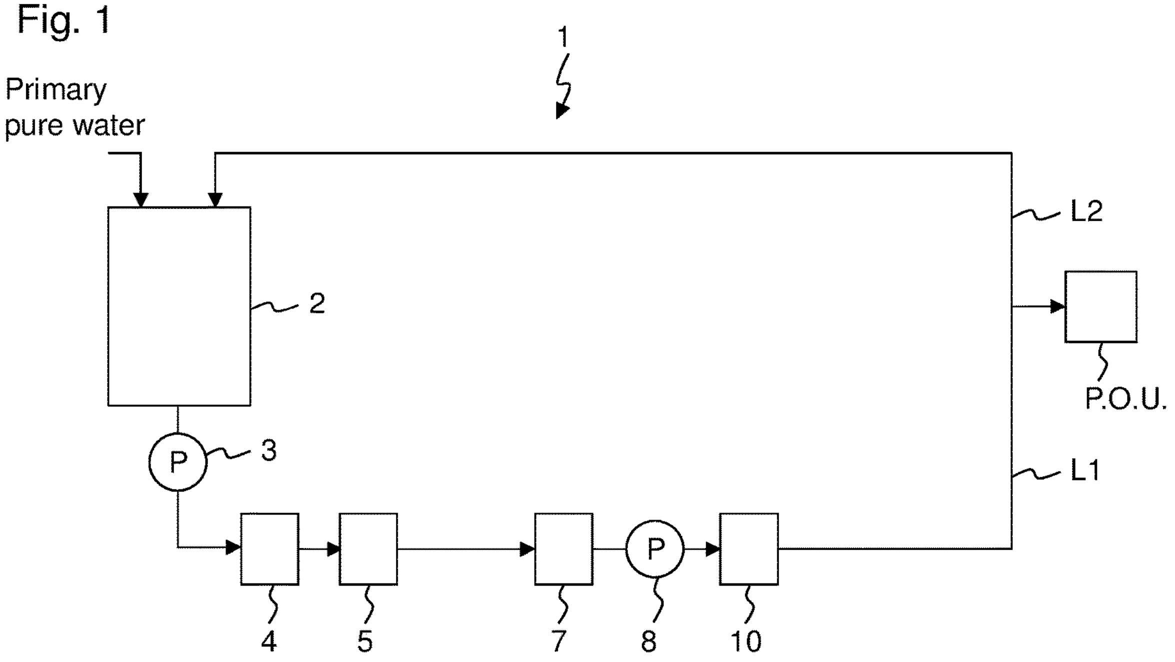
FIG. 1 is a schematic view of an ultrapure water production system according to a first embodiment of the present invention.

Embodiments of the present invention will now be described with reference to the drawings. FIG. 1 schematically shows subsystem 1 of an ultrapure water production apparatus according to the first embodiment of the present invention. Subsystem 1 is a system for producing ultrapure water, which is supplied to point of use P.O.U., from pure water that is produced by a primary pure water system (not illustrated). Subsystem 1 is also referred to as an ultrapure water production system. Ultrapure water supply line L1 is connected to and supplies ultrapure water to point of use P.O.U. Return line L2 is connected to ultrapure water supply line L1 upstream of point of use P.O.U. and returns ultrapure water that has not been used at point of use P.O.U. to the initial point of the ultrapure water supply line. Specifically, return line L2 is connected to primary pure water tank 2 and returns unused ultrapure water to the initial point of ultrapure water supply line L1 via primary pure water tank 2. The initial point refers to the most upstream point of ultrapure water supply line L1 in the flow direction of the water to be treated (pure water), and primary pure water tank 2 is connected to the initial point of ultrapure water supply line L1. Thus, ultrapure water supply line L1 and return line L2 form a circulation line along which pure water or ultrapure water circulates.

Subsystem 1 has primary pure water tank 2, pure water supply pump 3, ultraviolet ray oxidization apparatus 4, hydrogen peroxide removal apparatus 5, membrane deaeration apparatus 7, and final-stage ion exchange apparatus 10. These apparatuses are provided on ultrapure water supply line L1 in a series in the order stated above in the flow direction of the water to be treated. Booster pump 8 is provided between membrane deaeration apparatus 7 and final-stage ion exchange apparatus 10. Booster pump 8 is provided to ensure head, for example, when membrane deaeration apparatus 7 and final-stage ion exchange apparatus 10 are arranged at different levels. Accordingly, booster pump 8 may be omitted depending on the arrangement of subsystem 1. Pure water that is produced by the primary pure water system is stored in primary pure water tank 2, and as described above, ultrapure water that has not been used at point of use P.O.U. is returned to primary pure water tank 2.

Water to be treated that is stored in primary pure water tank 2 is pumped by pure water supply pump 3, is supplied to a heat exchanger (not illustrated) for temperature adjustment, and is then supplied to ultraviolet ray oxidization apparatus 4. Ultraviolet ray oxidization apparatus 4 irradiates the water to be treated with ultraviolet rays to dissolve organic carbon contained in the water to be treated and thus reduce the TOC (total organic carbon). Hydrogen peroxide removal apparatus 5 has a catalyst such as palladium (Pd) or platinum (Pt) and dissolves hydrogen peroxide that is generated by the radiation of ultraviolet rays. Final-stage ion exchange apparatus 10 (and upstream ion exchange apparatus 6, depending on embodiments) that is downstream of hydrogen peroxide removal apparatus 5 is therefore prevented from being damaged by oxidizing materials. Membrane deaeration apparatus 7 removes dissolved oxygen and carbon dioxide contained in the water to be treated. The ultrapure water is treated by final-stage ion exchange apparatus 10 before it is supplied to point of use P.O.U. Final-stage ion exchange apparatus 10 is charged with ion exchanger resins.

Water to be treated contains fine particles, and particularly when booster pump 8 is provided, may contain a larger number of fine particles. Fine particles can be removed by final-stage ion exchange apparatus 10 because fine particles typically have electric potentials (zeta potentials) on their surfaces. Although fine particles in ultrapure water generally have negative electric potential (zeta potential) on their surfaces, it is desirable to load ion exchanger resins in the form of a mixed bed of anion exchanger resins and cation exchanger resins in order to efficiently remove fine particles having positive electric potential (zeta potentials) as well. Loading Ion exchanger resins in the form of a mixed bed is also desirable for keeping ultrapure water in a highly pure condition. As a result, both fine particles having positive electric potential and fine particles having negative electric potential can be efficiently captured, and the removal efficiency of fine particles can be enhanced. However, the effect of removing fine particles can also be obtained by anion exchanger resins or cation exchanger resins that are loaded in a single bed. In addition, since fine particles typically have negative electric potential (zeta potential), the mass ratio of anion exchanger resins is preferably larger than the mass ratio of cation exchanger resins. Water to be treated that contains fine particles flows through the resins and therefore the resins themselves function as physical filters. Thus, the resins capture fine particles not only by an electric action but also by a physical action. For these reasons, final-stage ion exchange apparatus 10 is highly capable of removing fine particles. In the present embodiment, no membrane filter apparatus is provided between final-stage ion exchange apparatus 10 and point of use P.O.U. Therefore, ultrapure water from which fine particles have been removed by final-stage ion exchange apparatus 10 cannot be contaminated with fine particles that are generated by a membrane filter apparatus.

Ion exchanger resins are generally classified into a gel type and a macroporous type, and ion exchanger resins loaded in final-stage ion exchange apparatus 10 are preferably a granular gel type. Fine particles may also be generated from the surfaces of ion exchanger resins. However, ion exchanger resins of the gel type have a smaller surface area than ion exchanger resins of the macroporous type and therefore limit fine particles that detach and flow out. Thus, ion exchanger resins of the gel type are preferably used as ion exchanger resins loaded in final-stage ion exchange apparatus 10. As ion exchanger resins, for example, strongly acidic H-type ion exchanger resins and strongly basic OH-type ion exchanger resins are used. The average particle diameters of strongly acidic ion exchanger resins and strongly basic ion exchanger resins are preferably about 500 to 800 μm. The height of the resin bed of final-stage ion exchange apparatus 10 is preferably 10 cm or more, and more preferably 30 cm or more.

The water to be treated that is supplied to final-stage ion exchange apparatus 10 is ultrapure water and therefore has extremely high purity. For this reason, the performance of final-stage ion exchange apparatus 10 does not deteriorate easily and ultrapure water from which fine particles are sufficiently removed can be reliably obtained for a long time at the outlet of final-stage ion exchange apparatus 10. Since final-stage ion exchange apparatus 10 can be used for a long time, the frequency of required maintenance is low. Accordingly, a non-regenerative ion exchange apparatus (a cartridge polisher) is advantageously used as final-stage ion exchange apparatus 10. In other words, non-generative resins are preferably used as ion exchanger resins for final-stage ion exchange apparatus 10. However, generative resins may alternatively be used. Final-stage ion exchange apparatus 10 is replaced when the concentration of fine particles at the outlet exceeds a predetermined value, but alternatively may be replaced when the conductivity of treated water at the outlet exceeds a predetermined value. Final-stage ion exchange apparatus 10 may also be an ion exchange apparatus that is charged with monolithic ion exchangers.

In order to further limit the generation of fine particles, final-stage ion exchange apparatus 10 has its inlet for ultrapure water above the exchanger resin bed and its outlet for ultrapure water below the exchanger resin bed. Consequently, the water to be treated is supplied to final-stage ion exchange apparatus 10 in the downward direction or as a downward flow. Thus, the ion exchanger resin layer is less likely to move and the generation of fine particles that is caused by friction between ion exchanger resins can be limited. As water supply continues, ion exchanger resins are pressed and compacted, whereby the ion exchanger resins are progressively less likely to move, and the generation of fine particles can be further limited. As a result, the function of the ion exchanger resins as a physical filter is also enhanced.

When the above-mentioned ultrapure water production system is operated, washing or conditioning of resins is preferably carried out in advance. When resins of an R—Na type or an R—Cl type (R is resin) are used for producing ultrapure water without any treatment, the water quality required for ultrapure water may not be satisfied due to dissociation of Na ions and Cl ions. For this reason, it is desirable to condition strongly acidic cation exchanger resins by using an acid solution and to condition strongly basic anion exchanger resins by using an alkaline solution. Furthermore, when an R—Na type is converted into an R—H type and an R—Cl type is converted into an R—OH type, the R—Na type is desirably reduced to less than 0.1% and the R—Cl type is desirably reduced to less than 1% of the total number of resins that are loaded in final-stage ion exchange apparatus 10. In addition, before ultrapure water that is treated by final-stage ion exchange apparatus 10 is supplied to point of use P.O.U., it is desirable to supply ultrapure water to the ion exchanger resins until the TOC (total organic carbon) decreases to 0.5 μg/L (ppb) or less at the outlet of final-stage ion exchange apparatus 10. The decrease in the TOC refers to the TOC at the inlet of final-stage ion exchange apparatus 10 minus the TOC at the outlet of final-stage ion exchange apparatus 10 (ΔTOC). The supply of ultrapure water is preferably continued for a longer time in order to reduce the number of fine particles. For example, as will be described later in the examples, fine particles having particle diameters of 20 nm or more can be reduced to less than 0.1 particles/ml by continuously supplying water at SV300 (1/hr) for about 24 hours. Alternatively, it is also possible to supply ultrapure water to ion exchanger resins in advance before the resins are loaded in final-stage ion exchange apparatus 10 to thereby wash the ion exchanger resins until the TOC decreases to 0.5 μg/L (ppb) or less and/or the number of discharged fine particles having particle diameters of 20 nm or more decreases to 0.1 particles/ml or less. The ion exchanger resins can then be loaded in final-stage ion exchange apparatus 10.

An ion exchange apparatus is typically provided to remove ions (metal and anion components). However, as described above, ion exchanger resins are capable of removing fine particles. It is difficult to wash or condition a filter membrane such as an ultrafiltration membrane or a microfiltration filter membrane, particularly on the secondary side (the outlet side) of the membrane. On the other hand, in the case of granular ion exchanger resins, fine particles that exist on the surfaces of the resins or inside the apparatus (the tower) of the resins can be easily removed by washing or conditioning. The inventors found that sufficient washing or conditioning can prevent ion exchanger resins from generating fine particles. According to the present embodiment, ultrapure water having a limited number of fine particles can be easily produced by providing final-stage ion exchange apparatus 10 that is mainly directed to removing fine particles.

In the present embodiment, space velocity SV of water to be treated that flows in final-stage ion exchange apparatus 10 is set to 170 (1/hr) or more, and preferably to 300 (1/hr) or more. Conventionally, a typical value of space velocity SV of water to be treated that flows in an ion exchange apparatus is about 30 to 100 (1/hr), and space velocity SV is greatly increased in comparison. In particular, the removal efficiency of fine particles is thus greatly enhanced, as will be described later in the examples.

Space velocity SV of an ion exchange apparatus (an ion exchange tower) is calculated as flow rate/quantity of resins (amount of filtering material), where $$\text{flow rate} = LV \times S$$

$$\text{quantity of resins} = h \times S$$

Therefore, $$SV = (LV \times S)/(h \times S) = LV/h$$

where LV is the linear velocity (flow rate) of the water to be treated that flows through resins in the ion exchange tower, S is the cross section of the flow channel of the ion exchange tower, and h is the height of the resin bed that is loaded in the ion exchange tower.

Accordingly, in order to increase the SV, either increasing linear velocity LV (method 1) or decreasing height h of the resin bed (method 2) may be used. It is also possible to change both linear velocity LV and height h of the resin bed, but this method also requires at least either method 1 or method 2 to be used.

Linear velocity LV can be increased by a number of methods, as described below.

(Method 1-1) Reduce cross section S of the flow channel of the ion exchange tower. When the flow rate is constant, linear velocity LV increases in inverse proportion to cross section S of the flow channel of the ion exchange tower. When subsystem 1 is newly constructed, the footprint of final-stage ion exchange apparatus 10 can be reduced.

(Method 1-2) Increase the flow rate of booster pump 8 (or pure water supply pump 3). Linear velocity LV increases in proportion to the flow rate.

(Method 1-3) When final-stage ion exchange apparatus 10 consists of a plurality of ion exchange towers that are connected in parallel, water to be treated is supplied to only some of the ion exchange towers. This method is similar to method 1-1 but is easy to carry out for existing facilities because this method only requires halting the use of some of the ion exchange towers.

Reducing height h of the resin bed only requires reducing the amount of resin to be loaded. The reduction of resin that is used leads to a reduction of the replacement of resin. This method is also easy to carry out for existing facilities.

Second Embodiment

Figure 2:
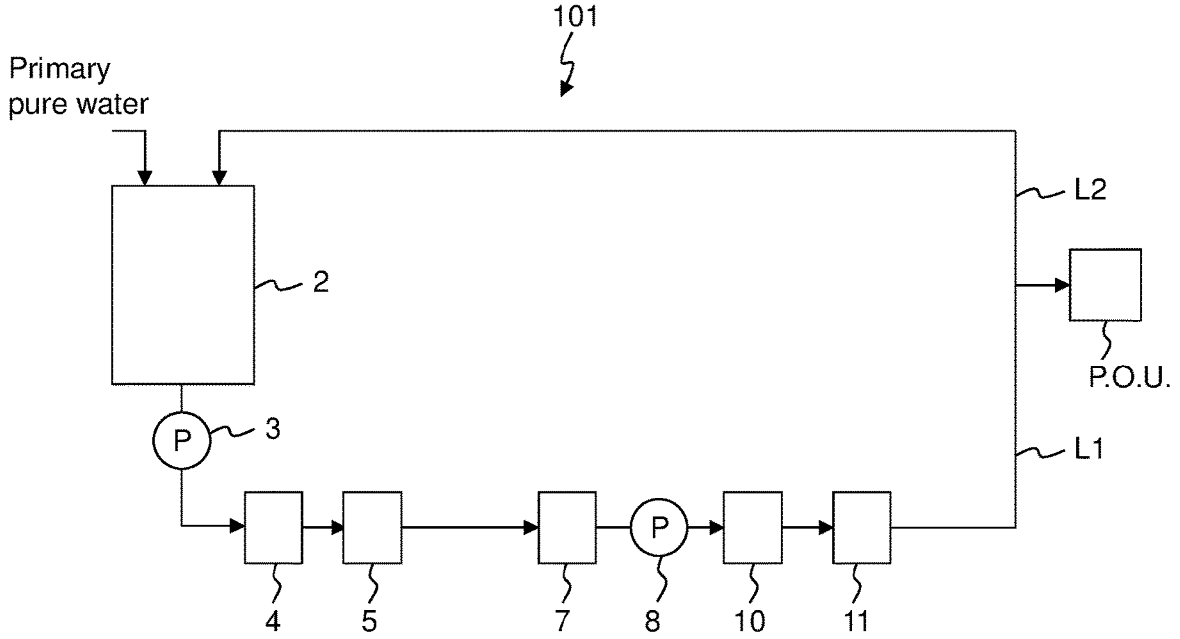
FIG. 2 is a schematic view of an ultrapure water production system according to a second embodiment of the present invention.

FIG. 2 schematically shows subsystem 101 of ultrapure water production apparatus according to the second embodiment of the present invention. In the present embodiment, membrane filter apparatus 11 is provided between final-stage ion exchange apparatus 10 and point of use P.O.U. The configuration is otherwise the same as the first embodiment. Refer to the first embodiment for the elements and effects that are not here described. Membrane filter apparatus 11 may be a microfiltration filter membrane apparatus or an ultrafiltration filter membrane apparatus. As described above, the performance of removing fine particles is greatly enhanced by increasing space velocity SV of final-stage ion exchange apparatus 10, but ultrapure water from which fine particles are further removed can be produced by providing membrane filter apparatus 11. Since most of the fine particles are removed by final-stage ion exchange apparatus 10, the load on membrane filter apparatus 11 is extremely low.

Accordingly, the above-mentioned problem relating to washing or conditioning is less likely to occur. Especially when booster pump 8 is provided, the number of fine particles in water to be treated increases such that fine particles may not be sufficiently removed by final-stage ion exchange apparatus 10. Thus, membrane filter apparatus 11 functions as a backup for final-stage ion exchange apparatus 10.

The pore diameter, the molecular weight cut-off, and so on of membrane filter apparatus 11 may be determined depending on the fine particles to be removed. For example, when the major purpose is to remove organic fine particles that detach from resins in final-stage ion exchange apparatus 10, membrane filter apparatus 11 having a comparatively large pore diameter (or a large molecular weight cut-off) may be sufficient. Thus, the pressure loss can be reduced, and the flow rate can be increased. On the other hand, since the number of (organic) fine particles that are generated (that detach) from membrane filter apparatus 11 does not largely vary depending on pore diameter, the number of fine particles per unit volume of ultrapure water that passes through membrane filter apparatus 11 is reduced (this is a type of dilution effect that results from the increase in flow rate). Accordingly, highly pure ultrapure water can be produced.

Third Embodiment

Figure 3:
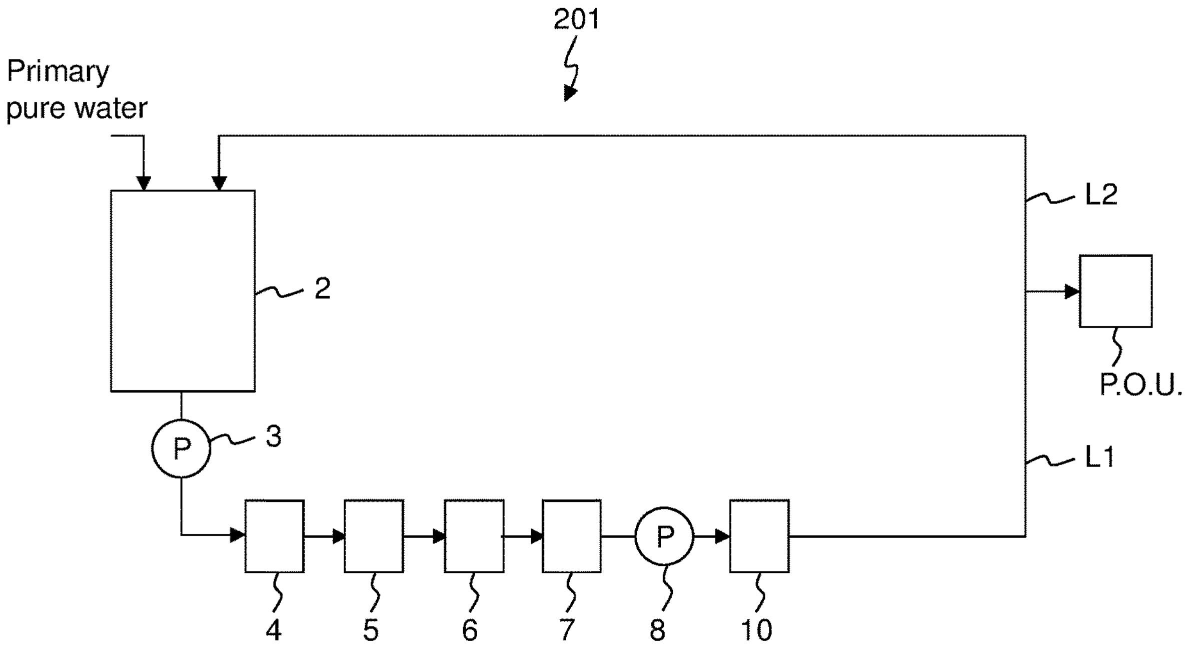
FIG. 3 is a schematic view of an ultrapure water production system according to a third embodiment of the present invention.

FIG. 3 schematically shows subsystem 201 of the ultrapure water production apparatus according to the third embodiment of the present invention. In the present embodiment, compared to the first embodiment, non-generative upstream ion exchange apparatus 6 is added, and the configuration is otherwise the same as the first embodiment. Refer to the first embodiment regarding elements and effects that are not here described. Upstream ion exchange apparatus 6 is provided on ultrapure water supply line L1 upstream of final-stage ion exchange apparatus 10, and more specifically, between hydrogen peroxide removal apparatus 5 and membrane deaeration apparatus 7. Upstream ion exchange apparatus 6 is a cartridge polisher that is charged with anion exchanger resins and cation exchanger resins in a mixed bed and removes ionic components such as metallic ions in the water to be treated. Upstream ion exchange apparatus 6 may also be an electric deionization water production apparatus (EDI). Space velocity SV of upstream ion exchange apparatus 6 is not particularly limited but is preferably about 30 to 100 (1/hr), which is a conventionally used range.

The provision of upstream ion exchange apparatus 6 can enhance the removal efficiency of ionic impurities. In other words, upstream ion exchange apparatus 6 has the function of removing ionic impurities, which is the original function of an ion exchange apparatus, and final-stage ion exchange apparatus has the function of removing fine particles, which is a special function that is not seen in a conventional ion exchange apparatus. Both ionic impurities and fine particles can be efficiently removed by providing both apparatuses.

Figure 4A:
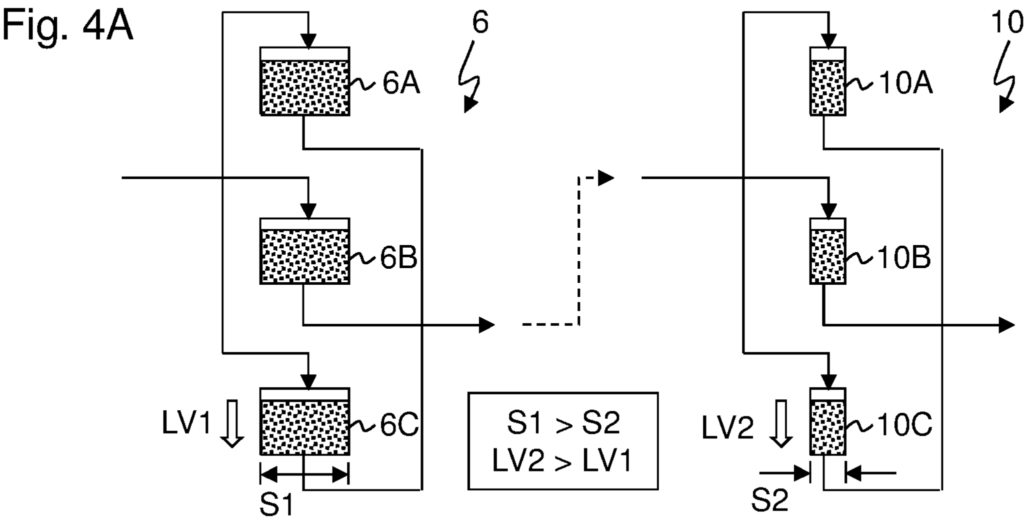
FIG. 4A is a conceptual view illustrating a method of setting different space velocities for an upstream ion exchange apparatus and the final-stage ion exchange apparatus in the third embodiment.
Figure 4B:
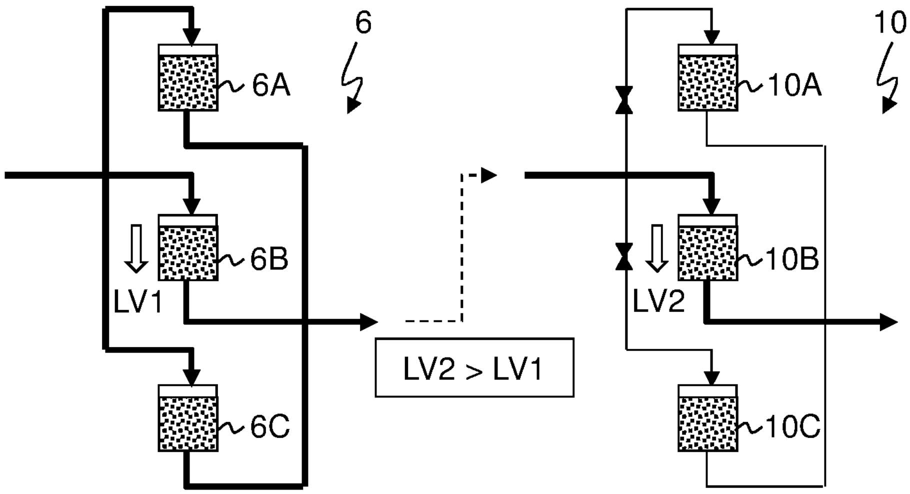
FIG. 4B is a conceptual view illustrating another method of setting different space velocities for the upstream ion exchange apparatus and the final-stage ion exchange apparatus in the third embodiment.
Figure 4C:
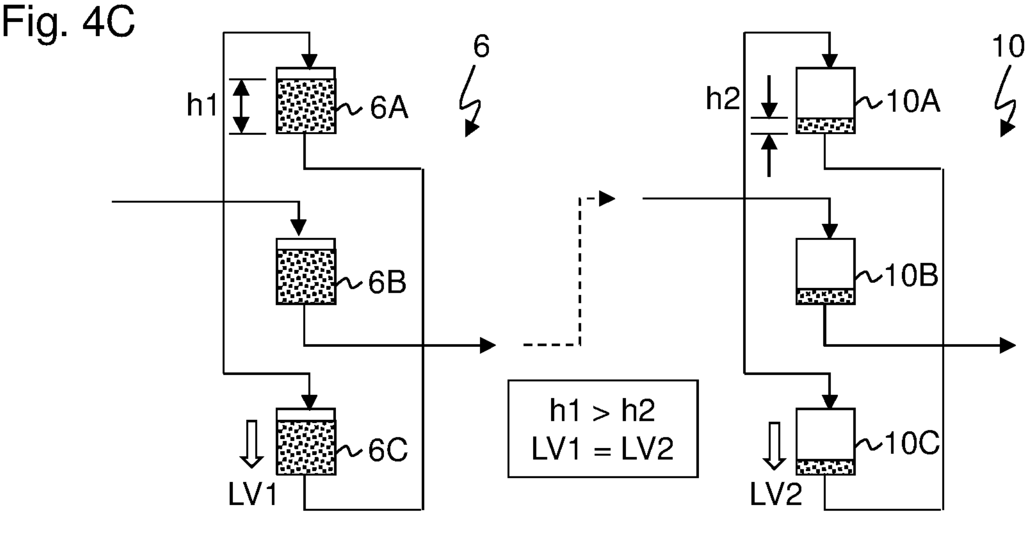
FIG. 4C is a conceptual view illustrating another method of setting different space velocities for the upstream ion exchange apparatus and the final-stage ion exchange apparatus in the third embodiment.

FIGS. 4A to 4C show methods for setting different space velocities SV for upstream ion exchange apparatus 6 and final-stage ion exchange apparatus 10. For convenience of explanation, it will be assumed that upstream ion exchange apparatus 6 and final-stage ion exchange apparatus 10 consist of a plurality of and the same number of (in this case three) ion exchange towers 6A to 6C and 10A to 10C, respectively. FIG. 4A shows the concept used in method 1-1. Linear velocity LV2 of final-stage ion exchange apparatus 10 can be set larger than linear velocity LV1 of upstream ion exchange apparatus 6 by making cross section S2 of the flow channel of each ion exchange tower 10A to 10C of final-stage ion exchange apparatus 10 smaller than cross section S1 of the flow channel of each of ion exchange towers 6A to 6C of upstream ion exchange apparatus 6. FIG. 4B shows the concept used in method 1-3. Only one of ion exchange towers 10A to 10C of final-stage ion exchange apparatus 10 (ion exchange tower 10B in the illustrated example) is operated and the other towers (ion exchange towers 10A and 10C in the illustrated example) are not operated. Since the flow rate of water to be treated that flows through subsystem 201 is n×LV×S=constant (where n is the number of the ion exchange towers), different linear velocities LV can be set for upstream ion exchange apparatus 6 and final-stage ion exchange apparatus 10 by changing n even when cross section S of the flow channels is constant. When subsystem 201 is newly constructed, it is possible, for example, to provide a plurality of ion exchange towers as upstream ion exchange apparatus 6 and to provide a number of ion exchange towers as final-stage ion exchange apparatus 10, this number being at least one but smaller than the number of ion exchange towers in upstream ion exchange apparatus 6. In this case, all of the ion exchange towers may have the same configuration. FIG. 4C shows the concept used in method 2. Height h2 of the resin bed of each of ion exchange towers 10A to 10C of final-stage ion exchange apparatus 10 is smaller than height h1 of the resin bed of each of ion exchange towers 6A to 6C of upstream ion exchange apparatus 6. These methods may be applied independently or in combination. Method 1-2 is not applied because an increase in the flow rate of final-stage ion exchange apparatus 10 leads to an increase in the flow rate of upstream ion exchange apparatus 6, and as a result, different space velocities SV cannot be set for upstream ion exchange apparatus 6 and final-stage ion exchange apparatus 10. However, when the capacity of booster pump 8 (or pure water supply pump 3) is increased in order to increase the flow rate of final-stage ion exchange apparatus 10, method 1-2 may be applied together with at least one of methods 1-1, 1-3, and 2. In other words, method 1-2 may be applied together with other methods when the space velocity of final-stage ion exchange apparatus 10 cannot be sufficiently increased by methods 1-1, 1-3, or 2.

As illustrated in FIGS. 4A to 4C, different space velocities SV can be set by setting different characteristics for upstream ion exchange apparatus 6 and final-stage ion exchange apparatus 10 (for example, forms such as the cross section of the flow channels and the height of the resin beds or operation conditions such as the number of towers operated).

Fourth Embodiment

Figure 5:
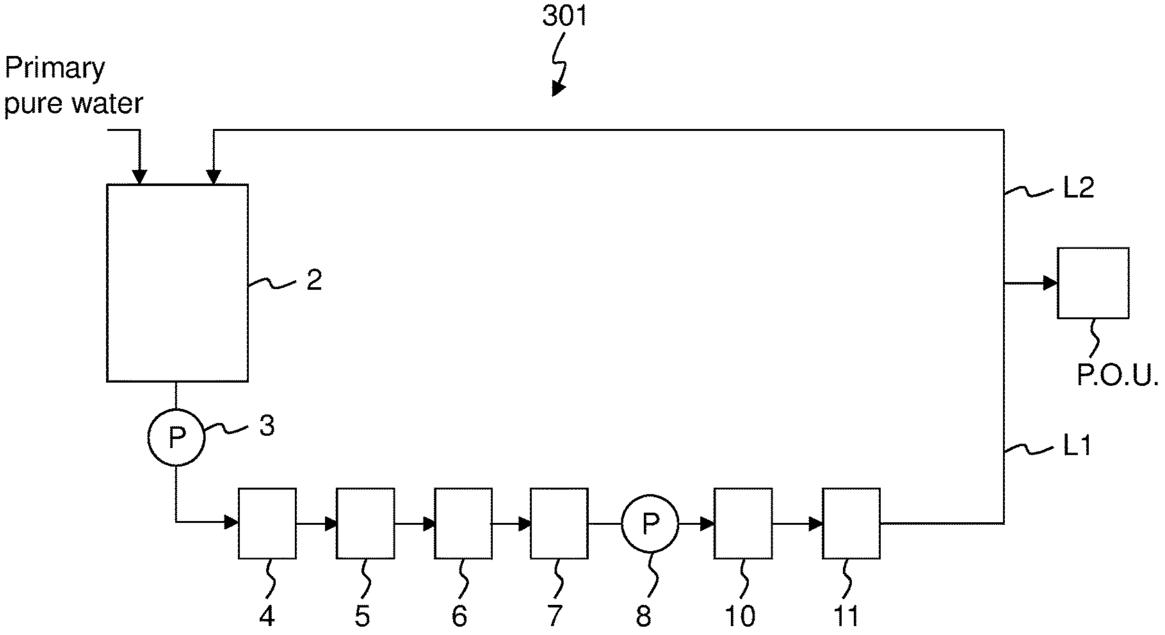
FIG. 5 is a schematic view of an ultrapure water production system according to a fourth embodiment of the present invention.

FIG. 5 schematically shows subsystem 301 of the ultrapure water production apparatus according to the fourth embodiment of the present invention. In the present embodiment, membrane filter apparatus 11 is provided between final-stage ion exchange apparatus 10 and point of use P.O.U. as in the second embodiment, and non-generative upstream ion exchange apparatus 6 of a mixed bed type is added as in the third embodiment. The configuration is otherwise the same as the first embodiment. Accordingly, the present embodiment has features of both the second and third embodiments and can produce ultrapure water from which ionic materials and fine particles are further removed. Refer to the second and third embodiments regarding each feature and to the first embodiment for the elements and effects that are not here described.

Fifth Embodiment

Figure 6:
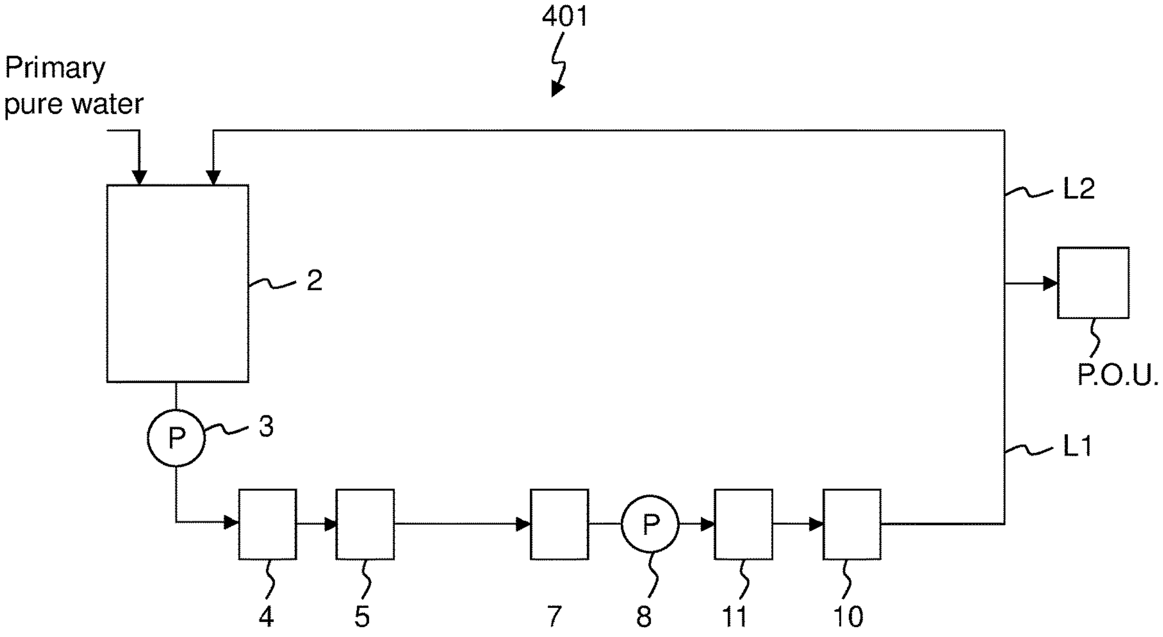
FIG. 6 is a schematic view of an ultrapure water production system according to a fifth embodiment of the present invention.

FIG. 6 schematically shows subsystem 401 of the ultrapure water production apparatus according to the fifth embodiment of the present invention. In the present embodiment, membrane filter apparatus 11 is provided upstream of final-stage ion exchange apparatus 10, and more specifically, between booster pump 8 and final-stage ion exchange apparatus 10. In other words, the positions of final-stage ion exchange apparatus 10 and membrane filter apparatus 11 are reversed compared to the second embodiment. The configuration is otherwise the same as the first embodiment. Refer to the first embodiment regarding the elements and effects that are not here described. No other water treatment apparatus is provided between membrane filter apparatus 11 and final-stage ion exchange apparatus 10. Membrane filter apparatus 11 may be a microfiltration filter membrane apparatus or an ultrafiltration filter membrane apparatus. Accordingly, the present embodiment can produce ultrapure water from which fine particles are further removed as in the second embodiment. In addition, since membrane filter apparatus 11 is provided upstream of final-stage ion exchange apparatus 10, the load upon final-stage ion exchange apparatus 10 is reduced. Thus, the interval for replacing final-stage ion exchange apparatus 10 can be extended. In addition, since fine particles that detach from and flow out from membrane filter apparatus 11 can be removed by final-stage ion exchange apparatus 10, the water quality of ultrapure water can be improved.

Sixth Embodiment

Figure 7:
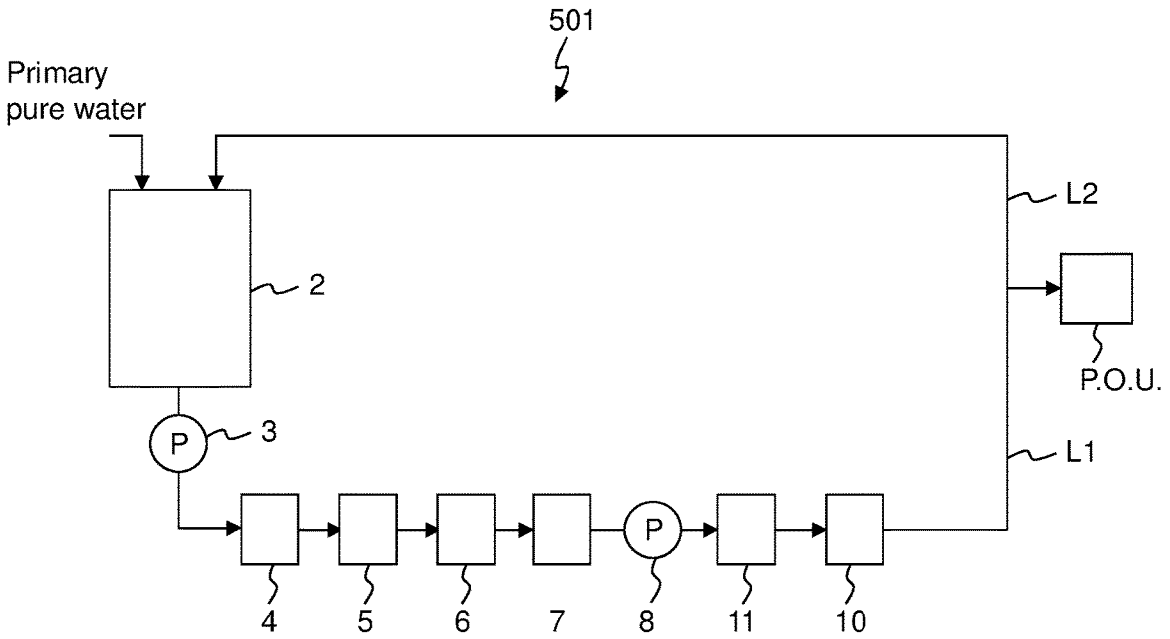
FIG. 7 is a schematic view of an ultrapure water production system according to a sixth embodiment of the present invention.

FIG. 7 schematically shows subsystem 501 of the ultrapure water production apparatus according to the sixth embodiment of the present invention. In the present embodiment, nongenerative upstream ion exchange apparatus 6 of a mixed-bed type is added as in the fourth embodiment, and membrane filter apparatus 11 is provided upstream of final-stage ion exchange apparatus 10 as in the fifth embodiment. In other words, the positions of final-stage ion exchange apparatus 10 and membrane filter apparatus 11 are reversed compared to the fourth embodiment. The configuration is otherwise the same as the first embodiment. Refer to the first embodiment regarding elements and effects that are not here described. No water treatment apparatus is provided between membrane filter apparatus 11 and final-stage ion exchange apparatus 10. Membrane filter apparatus 11 may be a microfiltration filter membrane apparatus or an ultrafiltration filter membrane apparatus. Accordingly, the present embodiment can produce ultrapure water from which ionic materials and fine particles are further removed as in the fourth embodiment. In addition, since membrane filter apparatus 11 is provided upstream of final-stage ion exchange apparatus 10 as in the fifth embodiment, the load upon final-stage ion exchange apparatus 10 is reduced. In addition, since fine particles that detach from and flow out from membrane filter apparatus 11 can be removed by final-stage ion exchange apparatus 10, the water quality of ultrapure water can be improved.

EXAMPLES

Figure 8:
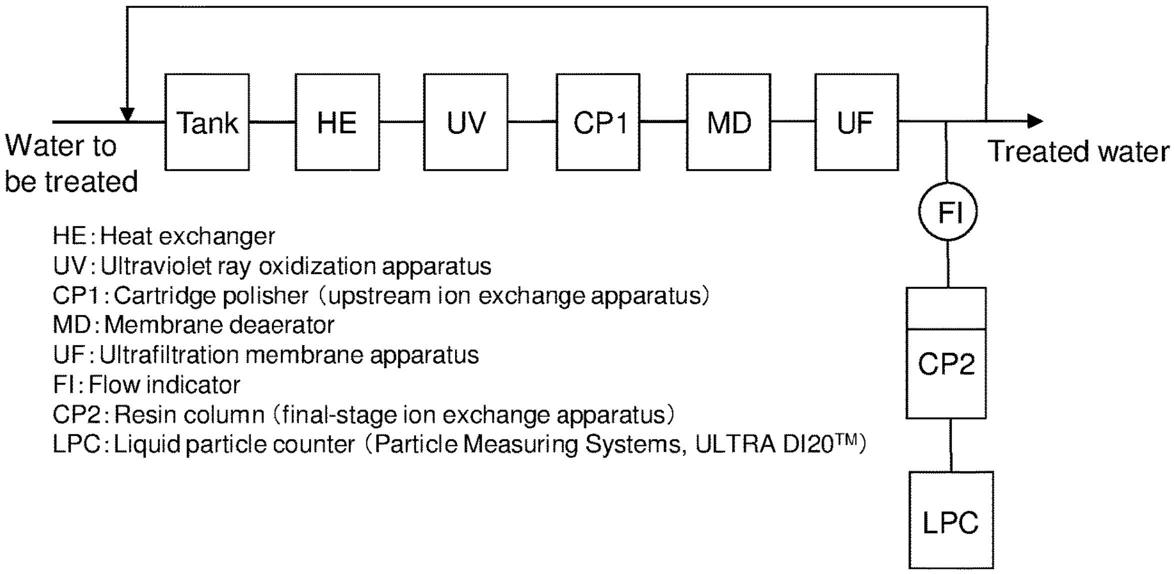
FIG. 8 is a view illustrating the configuration of the test apparatus used in the examples.
Figure 9:
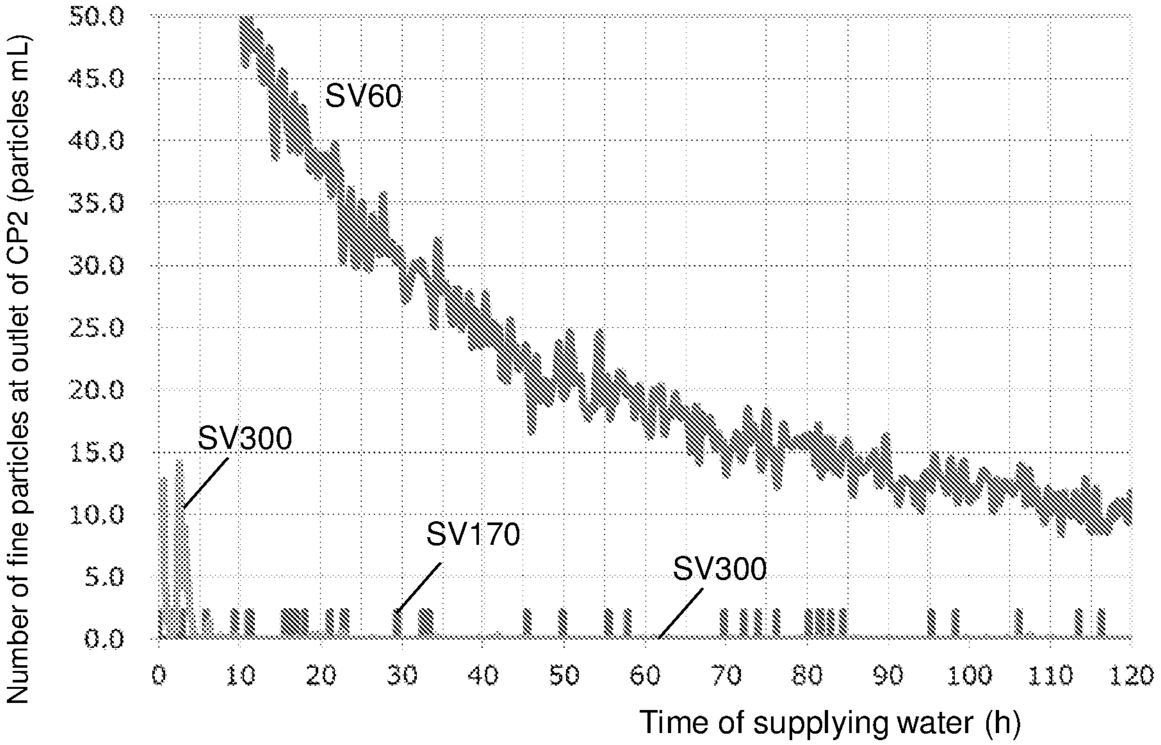
FIG. 9 is a graph showing the results of measuring the number of fine particles in the examples.

The performance of removing fine particles was measured using the test apparatus shown in FIG. 8. Each of the water to be treated and the treated water had a TOC of 0.6 μg/L and a specific resistance of 18.2 MΩ×cm. The number of fine particles having particle diameters of 20 nm or more contained in the water to be treated was 0.8 particles/mL. A column made of perfluoroalkoxy alkane (PFA) and having a diameter of 26 mm and a height of 500 mm was used as a resin column, and resins (ESP-2) were loaded with a bed height of 300 mm. The temporal change in the number of fine particles in the outlet water of the resin column was measured for SV of 60, 170, and 300 (1/hr) while supplying water to be treated (pure water) to the test apparatus. FIG. 9 shows the results. SV60 (1/hr) converted into linear velocity corresponds to LV18 (m/hr), SV170 (1/hr) converted into linear velocity corresponds to LV51 (m/hr), and SV300 (1/hr) converted into linear velocity corresponds to LV90 (m/hr). In the case of SV60 (1/hr), a long time was required for the reduction of the number of fine particles. In the case of SV170 (1/hr), fine particles were occasionally and intermittently detected, but the number of fine particles was comparatively stable. In the case of SV300 (1/hr), the number of fine particles temporarily increased at an early stage after the water supply was started, but sharply decreased and became substantially zero after the passage of 24 hours. Accordingly, regarding the time required for the number of fine particles to stabilize, SV170 (1/hr) and 300 (1/hr) are preferable and SV60 (1/hr) is not preferable.

Figure 10A:
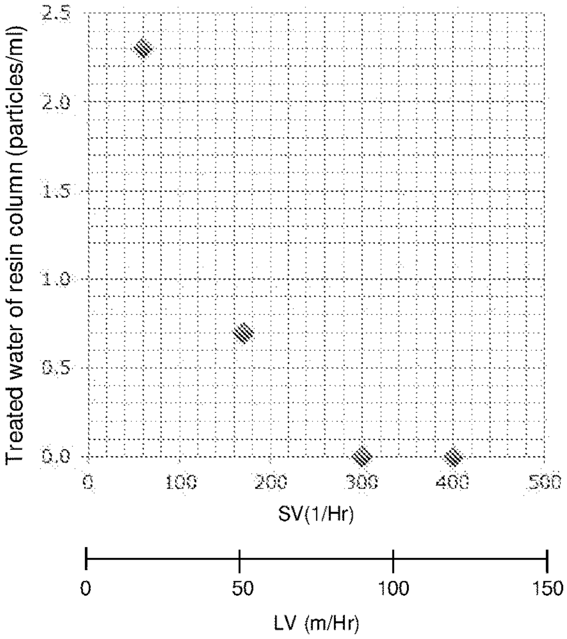
FIG. 10A is a graph showing the results of measuring the number of fine particles in the examples.
Figure 10B:
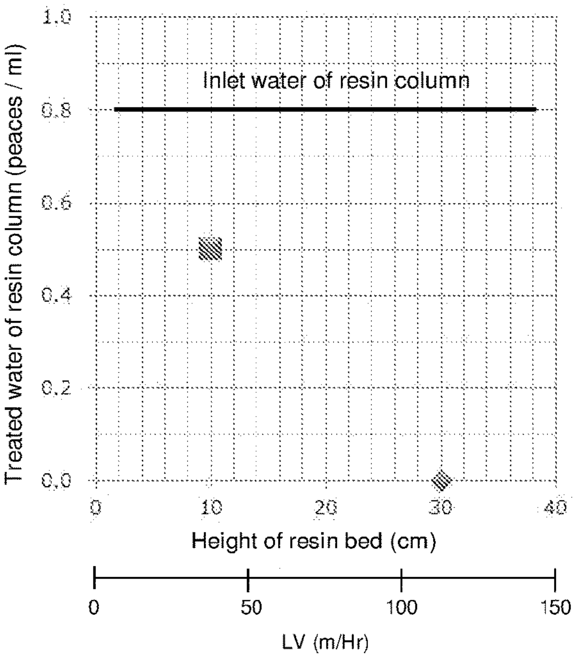
FIG. 10B is a graph showing the results of measuring the number of fine particles in the examples.
Figure 10C:
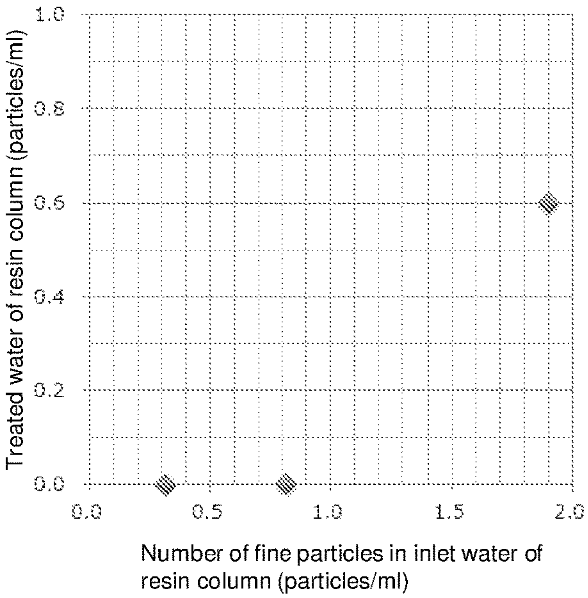
FIG. 10C is a graph showing the results of measuring the number of fine particles in the examples.

FIG. 10A shows the relationship between SV and LV and the number of fine particles in the outlet water of the resin column. The numbers of fine particles shown are values after stabilization. The height of the resin bed of the resin column was 30 cm. In this case, SV and LV are proportional to each other. It was found that SV170 (1/hr) or more (LV51 (m/hr) or more) was preferable and SV300 (1/hr) (LV90 (m/hr) or more) was more preferable from the viewpoint of the water quality of the treated water. FIG. 10B shows the relationship between the height of the resin bed, LV, and the number of fine particles in the outlet water of the resin column. SV was 400 (1/hr). In this case, the height of the resin bed and the LV are proportional to each other. The number of fine particles in the outlet water of the resin column decreased from the number of fine particles in the inlet water of the resin column when the height of the resin bed was 10 cm, but the number of fine particles in the outlet water of the resin column became zero when the height of the resin bed was 30 cm. Thus, it was found that the height of the resin bed was preferably at least 10 cm, and more preferably 30 cm or more. FIG. 100 shows the relationship between the numbers of fine particles in the inlet water and in the outlet water of the resin column. The height of the resin bed of the resin column was 30 cm, SV was 400 (1/hr), and the LV was 120 (m/hr). Although an excellent effect of removing fine particles was obtained regardless of the number of fine particles in the inlet water of the resin column, a significantly superior effect was obtained when the number of fine particles was 1.0 (particles/ml) or less, and the present invention was found to be suitable for producing extremely pure ultrapure water.

Although certain preferred embodiments of the present invention have been shown and described in detail, it should be understood that various changes and modifications may be made without departing from the spirit or scope of the appended claims.

LIST OF REFERENCE NUMERALS

1 subsystem (ultrapure water production system)
6 upstream ion exchange apparatus

10 final-stage ion exchange apparatus
11 filter membrane apparatus
L1 ultrapure water supply line
L2 return line
P.O.U. point of use

What is claimed is:

1. An ultrapure water production system comprising:

An ultrapure water supply line that is connected to a point of use and that supplies ultrapure water to the point of use;

A return line that returns the ultrapure water that has not been used at the point of use to the ultrapure water supply line;

A plurality of ion exchange apparatuses that are provided on the ultrapure water supply line, the plurality of ion exchange apparatuses including at least an upstream ion exchange apparatus and a final-stage ion exchange apparatus that is provided closest to the point of use; and At least one pump, Wherein ion exchanger resins are loaded in the plurality of ion exchange apparatuses, Wherein the at least one pump is configured such that a space velocity of water to be treated that flows in the final-stage ion exchange apparatus is 170 (1/hr) or more, Wherein the upstream ion exchange apparatus is provided on the ultrapure water supply line upstream of the final-stage ion exchange apparatus in a flow direction of water to be treated, Wherein the final-stage ion exchange apparatus includes at least one ion exchange tower, and the upstream ion exchange apparatus includes a plurality of ion exchange towers arranged in parallel, and Wherein the at least one ion exchange towers of the final-stage ion exchange apparatus through which the water to be treated flows are fewer in number than the ion exchange towers of the upstream ion exchange apparatus through which the water to be treated flows.

2. The ultrapure water production system according to claim 1, wherein the at least one pump is configured such that the space velocity is 300 (1/hr) or more.

3. The ultrapure water production system according to claim 1, wherein no membrane filter apparatus is provided between the final-stage ion exchange apparatus and the point of use.

4. The ultrapure water production system according to claim 1, further comprising a microfiltration filter membrane apparatus or an ultrafiltration filter membrane apparatus that is positioned between the final-stage ion exchange apparatus and the point of use.

5. The ultrapure water production system according to claim 1, wherein the at least one pump is configured such that a space velocity of the water to be treated that flows in the upstream ion exchange apparatus is 30 to 100 (1/hr).

6. The ultrapure water production system according to claim 5, wherein, a height of a resin bed of the ion exchanger resins that are loaded in the ion exchange tower of the final-stage ion exchange apparatus is smaller than a height of a resin bed of ion exchanger resins that are loaded in the ion exchange tower of the upstream ion exchange apparatus.

7. The ultrapure water production system according to claim 1, further comprising a microfiltration filter membrane apparatus or an ultrafiltration filter membrane apparatus that is positioned upstream of the final-stage ion exchange apparatus, wherein no water treatment apparatus is provided between the microfiltration filter membrane apparatus or the ultrafiltration filter membrane apparatus and the final-stage ion exchange apparatus.

8. An ultrapure water production system comprising:

An ultrapure water supply line that is connected to a point of use and that supplies ultrapure water to the point of use;

A return line that returns the ultrapure water that has not been used at the point of use to the ultrapure water supply line;

A plurality of ion exchange apparatuses that are provided on the ultrapure water supply line, the plurality of ion exchange apparatuses including at least an upstream ion exchange apparatus and a final-stage ion exchange apparatus that is provided closest to the point of use; and At least one pump, Wherein ion exchanger resins are loaded in the plurality of ion exchange apparatuses, Wherein the at least one pump is configured such that a linear velocity of water to be treated that flows in the final-stage ion exchange apparatus is 51 (m/hr) or more, Wherein the upstream ion exchange apparatus is provided on the ultrapure water supply line upstream of the final-stage ion exchange apparatus in a flow direction of water to be treated, Wherein the final-stage ion exchange apparatus includes at least one ion exchange tower, and the upstream ion exchange apparatus includes a plurality of ion exchange towers arranged in parallel, and Wherein the at least one ion exchange towers of the final-stage ion exchange apparatus through which the water to be treated flows are fewer in number than the ion exchange towers of the upstream ion exchange apparatus through which the water to be treated flows.

* * * * *